June 24, 1930. B. YOUNG 1,767,498
PISTON RING
Filed May 8, 1929
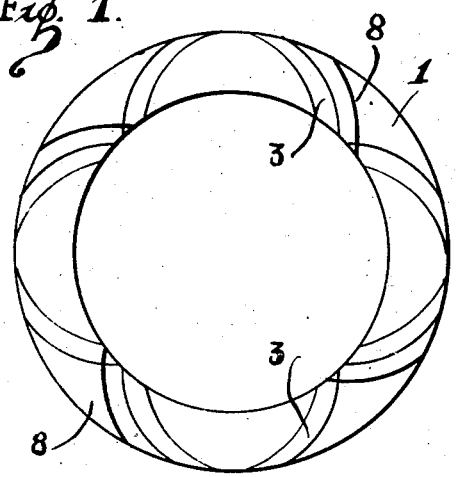
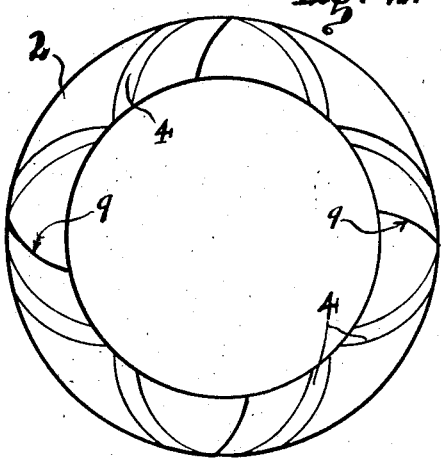
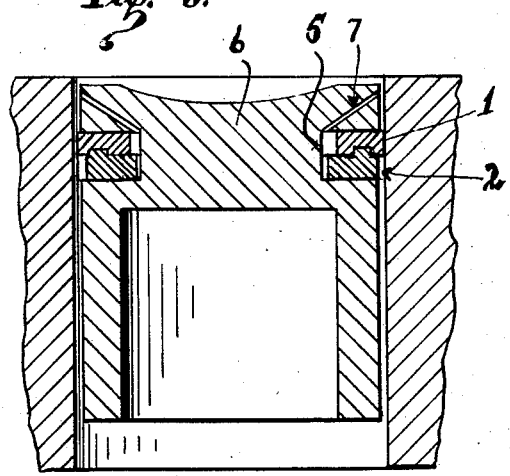
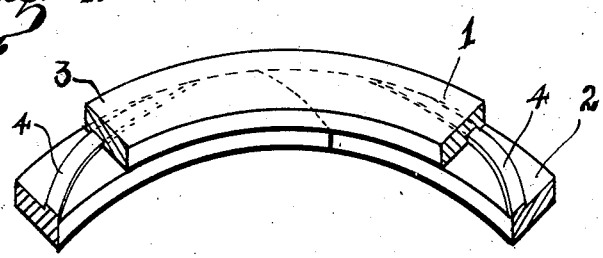
INVENTOR
Bernard Young
BY
ATTORNEY Patented June 24, 1930

1,767,498

UNITED STATES PATENT OFFICE

BERNARD YOUNG, OF SAN PEDRO, CALIFORNIA

PISTON RING

Application filed May 8, 1929. Serial No. 361,299.

This invention relates to a piston ring or packing used upon the pistons in internal or external combustion engines, pumps, compressors, rams, rods, or the like. This invention relates to a tension controlled packing ring, an object being to govern the pressures that build up or exist behind packing rings when in operation, it being immaterial how the pressure is conveyed back of the rings.

Another object is to provide a ring which is made up of two or more component parts, a wearing ring or rings which contacts with, for instance, the walls of the cylinder and makes a tight joint between the piston and the cylinder walls, and secondly, a control ring which holds the wearing ring or rings in check or controls it.

A further object is to so split the force existing or entering behind the ring so that it will perform work in opposite directions.

Other objects, advantages, and features of invention may appear from the accompanying drawing, the subjoined detailed description, and the appended claims:

In the drawing:

Figure 1 is a plan view of the wearing ring.

Figure 2 is a bottom plan view of the control ring.

Figure 3 is a transverse fragmentary sectional view of a piston and cylinder with my rings mounted in the piston.

Figure 4 is a fragmentary perspective view of the assembled ring.

This ring operates on the theory that force behind the rings or packing, if directed in opposite directions so that half the force is turned into resistance, the ring will be in suspension or balance, all things being equal. That is, friction and pressure on the area of both rings susceptible to the force is equal. I am conceding that equal areas move an equal distance when propelled by the same or equal forces, friction not being considered, and that the travel varies proportionately to the change in areas. By inscribing a mean circle on each of the rings, the length of the circle to equal the force, and then dividing the circles into a plurality of equal arcs, and then set these arcs one against the other on the surface of the rings, so that the circles are balanced or suspended. Now applying this arrangement to both rings, one the wearing ring and the other the control ring, we have a ring that is balanced under pressure if the areas exposed to the pressure are equal.

Now decreasing the area of one ring I increase the travel of the other proportionately to the amount of reduction of the area. The friction between the rings including the grooves and shoulders has an equal area to work on and the friction on one ring should be the same as the friction on the other. It would seem that as the pressure increases, the wearing ring would be forced more tightly against the cylinder wall but this increased force is reduced somewhat by the corresponding increase in frictional resistance on the lower face of the wearing ring.

Referring more particularly to the drawing, my ring comprises two parts, the wearing ring 1 and the control ring 2. These two rings are of exactly the same outside and inside diameter. A mean circle is inscribed on the face of each of the rings and these two circles are made to equal the force. Each circle is then divided into a plurality of equal arcs, for example, in the drawing I have divided the circle into eight even arcs. Four of these arcs from each circle are then placed upon the rings 1, 2 so that they are inclined oppositely. These arcs are evenly spaced and pitched around the face of the rings and then on the face of the wearing ring 1 I cut grooves 3 corresponding to the arcs above described, and on the face of the control ring 2 I provide shoulders 4, the shoulders 4 being adapted to fit into the groves 3. It will be seen that all of the arcs 3 and the shoulders 4 are identical in length and in pitch and are equally spaced around the circumference of the rings. The purpose of the arcs which are drawn on the face of the rings is merely to position the grooves and shoulders, both as to pitch and length, which are cut on the rings.

The rings 1, 2 are placed together, as shown in Figures 3 and 4, and are placed in the groove 5 of the piston 6. A duct 7 extends from adjacent the upper end of the piston into the groove 5, thus admitting the compression pressure of the engine to the inner face of the rings 1, 2. The thickness of the control ring is varied to give the required pressure of the wearing ring against the wall of the cylinder and any force acting against the wearing ring tending to expand it outwardly will cause the control ring to move inwardly along the grooves, thus tending to reduce the excessive outward pressure of the wearing ring. If desired, both the wearing and control rings can be split at one point only or the said rings can be cut into a plurality of equal segments, these cuts being shown at 8, and in that event the control ring is also cut into the same number of segments by the cuts 9, but it is necessary that the cuts 9 shall not overlap the cuts 8. Otherwise, the action of the ring would be ineffective.

There is an advantage of splitting the rings into a plurality of segments because with this arrangement they are not subject to elastic strains. It will be evident that as the wearing ring expands or moves outwardly that there will be a squeezing or pinching action on the control ring, tending to force the same inwardly, and meet the pressure, thus reducing or minimizing the expansion of the wearing ring. That is the sides of the grooves in the wearing ring act upon the shoulders 4 like a cam, and thus the radial movement of the control ring is opposite to that of the wearing ring. The pressure on the wearing ring forcing it outwardly will naturally increase the circumference of the ring. This increase in circumference imparts a slight rotary movement to the segments of the ring, which cams the control ring in the opposite direction.

It would be seen that the wearing ring segments would carry the control ring segments with it but the control ring segments are oppositely arranged to those of the wearing ring and a pinching action is going on simultaneously all around the circle or ring, forcing the same inwardly but the pressure will not let the ring go in so far that the wearing ring will leave the face of the cylinder.

Having described my invention, I claim:

1. A packing element, a wearing ring, a control ring, said wearing ring having a plurality of oppositely directed arcuate grooves formed on the face thereof, and said control ring being formed with a plurality of arcuate shoulders adapted to fit into said grooves.

2. A packing element comprising a wearing ring and a control ring, both of said rings being divided into a plurality of equal segments, said wearing ring having a plurality of oppositely pitched grooves on each of said segments, and said control ring being formed with oppositely pitched shoulders thereon adapted to fit into said grooves.

3. In a piston having a ring groove therein, a packing element in said groove, said piston having a duct therein extending from adjacent the top thereof to said groove, said packing element comprising a plurality of superposed rings, one of said rings being adapted to bear against the wall of the cylinder, a control ring, and means connecting said first named ring and the control ring whereby the movement of said first named ring is counteracted by the control ring.

4. In a piston having a ring groove therein, a packing element in said groove, said piston having a duct therein extending from adjacent the top thereof to said groove, said packing element comprising a plurality of superposed rings, one of said rings being adapted to bear against the wall of the cylinder, a control ring, and means connecting said first named ring and the control ring whereby the movement of said first named ring is counteracted by the control ring, said means comprising a plurality of oppositely pitched arcuate shoulders on the control ring, said first named ring having a plurality of arcuate oppositely pitched grooves formed therein into which said shoulders are adapted to fit.

In testimony whereof, I affix my signature.

BERNARD YOUNG.